(12) United States Patent
Yeh

(10) Patent No.: US 8,988,041 B2
(45) Date of Patent: Mar. 24, 2015

(54) HANDHELD ELECTRONIC DEVICE WITH POSITIONING FUNCTION

(76) Inventor: Ming-Hsiang Yeh, Taipei (TW)

( * ) Notice: Subject to any disclaimer, the term of this patent is extended or adjusted under 35 U.S.C. 154(b) by 406 days.

(21) Appl. No.: 13/478,195

(22) Filed: May 23, 2012

(65) Prior Publication Data

US 2012/0306440 A1    Dec. 6, 2012

(30) Foreign Application Priority Data

Jun. 1, 2011    (TW) .............................. 100209923 U

(51) Int. Cl.
*H02J 7/00*    (2006.01)
*H02J 7/02*    (2006.01)
*H04M 1/02*    (2006.01)

(52) U.S. Cl.
CPC ............... *H02J 7/0042* (2013.01); *H02J 7/025* (2013.01); *H04M 1/0254* (2013.01)
USPC ..................................................... 320/108

(58) Field of Classification Search
CPC ...... H02J 7/025; Y02T 90/122; B60L 11/182; Y02E 60/12
USPC ........................................................ 320/108
See application file for complete search history.

(56) References Cited

U.S. PATENT DOCUMENTS

| | | | |
|---|---|---|---|
| 7,022,046 B2 * | 4/2006 | Kim ................................. | 482/1 |
| 2008/0318622 A1 * | 12/2008 | Jen .............................. | 455/552.1 |
| 2010/0081377 A1 * | 4/2010 | Chatterjee et al. ........... | 455/41.1 |

* cited by examiner

Primary Examiner — Stacy Whitmore
Assistant Examiner — Magid Dimyan
(74) Attorney, Agent, or Firm — Bacon & Thomas, PLLC

(57) ABSTRACT

Disclosed is a handheld electronic device with positioning function that includes a device body that contains a transceiver circuit module, a positioning element, and a counterpart positioning element that corresponds to the positioning element in order to effect mutual positioning with respect to each other. The positioning element and the counterpart positioning element are both mounted to one side of the device body. Through rotating or putting up-side down one of two handheld electronic devices, the two handheld electronic devices can be positioned with respect to each other through the positioning elements and the counterpart positioning elements so as to have the transceiver circuit modules of the two handheld electronic devices precisely aligning with each other.

17 Claims, 13 Drawing Sheets

HANDHELD ELECTRONIC DEVICE WITH POSITIONING FUNCTION

FIELD OF THE INVENTION

The present invention relates to a handheld electronic device, and in particular to a handheld electronic device with positioning function that allows transceiver circuit modules of two handheld electronic devices to precisely correspond to each other in order to facilitate bidirectional wireless charging and wireless discharging.

BACKGROUND OF THE INVENTION

Charging of a battery contained in a handheld electronic device has been evolved from wired charging to unidirectional wireless charging, and even bidirectional wireless charging, which means both wireless charging and wireless discharging can be done.

Bidirectional wireless charging employs a transceiver circuit module to effect wireless transmission and wireless reception in order to allow electrical power of a first handheld electronic device to be transmitted to and stored in a second handheld electronic device, or oppositely, to allow the electrical power of the second handheld electronic device to be transmitted to and stored in the first handheld electronic device.

Such bidirectional wireless charging is convenient, but there is always loss of electrical power in the process of wireless transmission and reception. To provide the maximum efficiency of wireless charging/discharging, proper alignment between two transceiver circuits is very critical.

A conventional positioning structure that is used for unidirectional wireless charging comprises a magnetic attraction body mounted to a charger and having the positive pole facing outward and a magnetic attraction body mounted to a handheld electronic device with the negative pole facing outward. To proceed with charging, the positive pole of the magnetic attraction body of the charger is positioned close to the negative pole of the magnetic attraction body of the handheld electronic device to allow positioning to be done by the positive pole of the magnetic attraction body attracting the negative pole of the magnetic attraction body together.

However, such a positioning structure for unidirectional wireless charging is not applicable to bidirectional wireless charging/discharging. For example, the positive pole of the magnetic attraction body of the charger can attract and attach to the negative pole of the magnetic attraction body of a first handheld electronic device for wireless charging, but if the already-charged first handheld electronic device is to wirelessly charge a second handheld electronic device, due to the repulsion induced between poles of identical polarity, the negative pole of the magnetic attraction body of the first handheld electronic device is expelled from attach to the negative pole of the magnetic attraction body of the second handheld electronic device, leading to improper positioning and thus poor charging efficiency due to improper positioning.

Thus, the challenge that the present invention intends to overcome is to provide a handheld electronic device that has a positioning function and the positioning function is applicable to bidirectional wireless charging/discharging.

SUMMARY OF THE INVENTION

An object of the present invention is to provide a handheld electronic device with positioning function, which employs an arrangement of a positioning element and a counterpart positioning element in combination with a transceiver circuit module to allow two handheld electronic devices to be positionable with respect to each other via the positioning elements and the counterpart positioning elements thereby by simply rotating or putting up-side down one of the two handheld electronic devices thereby having the transceiver circuit modules of the two handheld electronic devices precisely aligned with each other to minimize power loss incurring in the process of wireless transmission and wireless reception and thus satisfying the need for bidirectional wireless charging and discharging.

To achieve the above object, the present invention provides a handheld electronic device with positioning function, which comprises a device body, a bidirectional wireless charging/discharging unit, at least one positioning element, and at least one counterpart positioning element. The bidirectional wireless charging/discharging unit is arranged inside the device body and comprises a transceiver circuit module. The positioning element is mounted to one side the device body in such a way that the positioning element and the transceiver circuit module are spaced from each other by a spacing distance. The counterpart positioning element is also mounted to the side of the device body and the counterpart positioning element corresponds to the positioning element so as to be positionable with respect to each other. The location where the counterpart positioning element is set on the side corresponds to the location where the positioning element is set.

As such, two handheld electronic devices are positionable with respect to each other via the positioning elements and the counterpart positioning elements thereof to have the transceiver circuit modules of the two handheld electronic devices precisely aligned with each other.

BRIEF DESCRIPTION OF THE DRAWINGS

The present invention will be apparent to those skilled in the art by reading the following description of preferred embodiments thereof with reference to the drawings, in which.

DETAILED DESCRIPTION OF THE PREFERRED EMBODIMENTS

Figure 1:
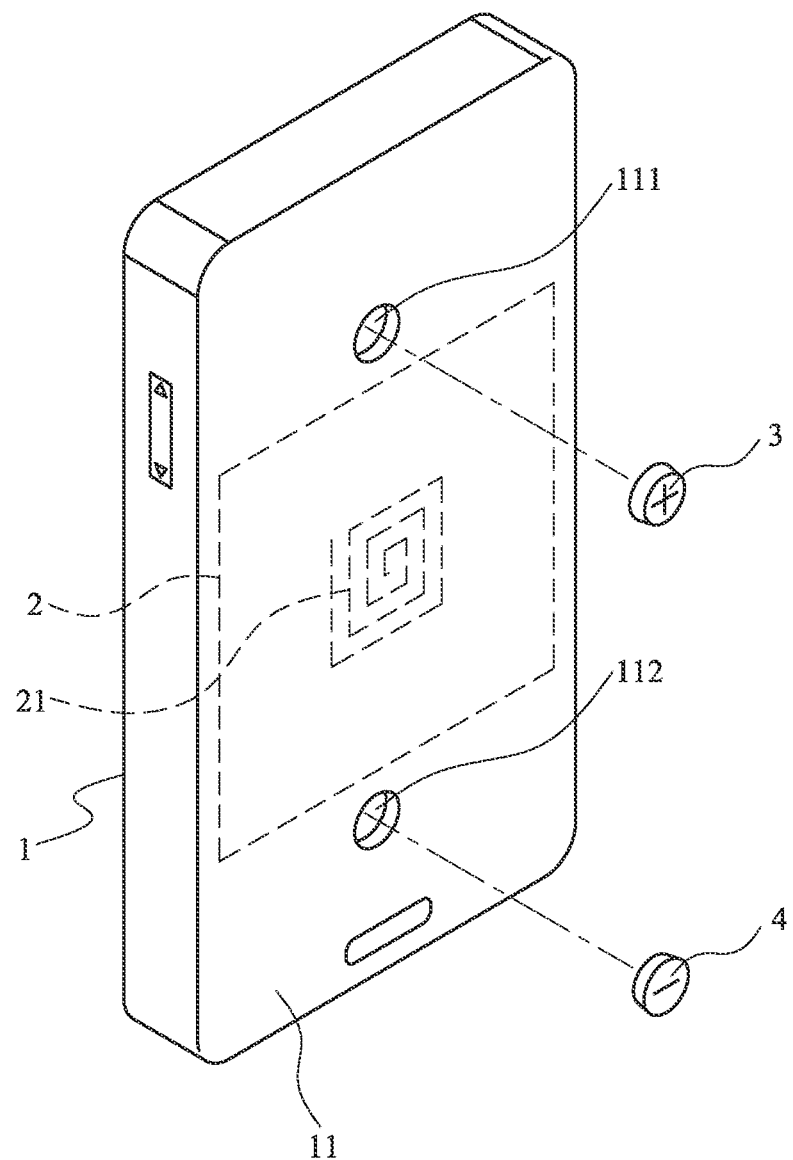
FIG. 1 is an exploded view of a first embodiment of the present invention.

The present invention provides a handheld electronic device with positioning function, which allows transceiver circuit modules of two handheld electronic devices to be set in precise alignment through positioning in order to facilitate bidirectional wireless charging or discharging. Shown in FIGS. 1-4 is a first embodiment according to the present invention and shown in FIGS. 5, 6, 7, and 9 are respectively second, third, fourth, and fifth embodiments according to the present invention. It is noted that bidirectional wireless charging/discharging unit 2 is omitted from FIGS. 3 and 5.

First Embodiment

Referring to FIGS. 1-4, which show a first embodiment according to the present invention, the first embodiment of the present invention comprises a device body 1, a bidirectional wireless charging/discharging unit 2, a positioning element 3, and a counterpart positioning element 4. The bidirectional wireless charging/discharging unit 2 is arranged inside the device body 1 and the bidirectional wireless charging/discharging unit 2 comprises a transceiver circuit module 21 for wireless transmission and wireless reception. The positioning element 3 can be mounted to any side of the device body 1 (such as a front face 12 (reference being shown in FIG. 3), a back face 11, and lateral sides 15) and is, as shown in the drawings, illustratively mounted to the back face 11. The transceiver circuit module 21 is also located close to the back face 11, and a spacing distance is set between the positioning element 3 and the transceiver circuit module 21. The counterpart positioning element 4 is set to correspond to the positioning element 3 and they are positionable with respect to each other. The counterpart positioning element 4 is also mounted to the back face 11 of the device body 1. The location where the counterpart positioning element 4 is mounted to the back face 11 is corresponding to the location where the positioning element 3 is mounted so that the transceiver circuit module 21 is located at a center position between the positioning element 3 and the counterpart positioning element 4.

The back face 11 of the device body 1 forms two cavities 111, 112 in which the positioning element 3 and the counterpart positioning element 4 are respectively embedded. The positioning element 3 can be a magnetic attraction body having a positive pole facing outward and the counterpart positioning element 4 corresponding to the positioning element can be a magnetic attraction body having a negative pole facing outward, so that the positioning element 3 and the counterpart positioning element 4 are magnetically attractable to each other. This is because opposite magnetic polarities attract each other while identical magnetic polarities expel each other.

Figure 2:
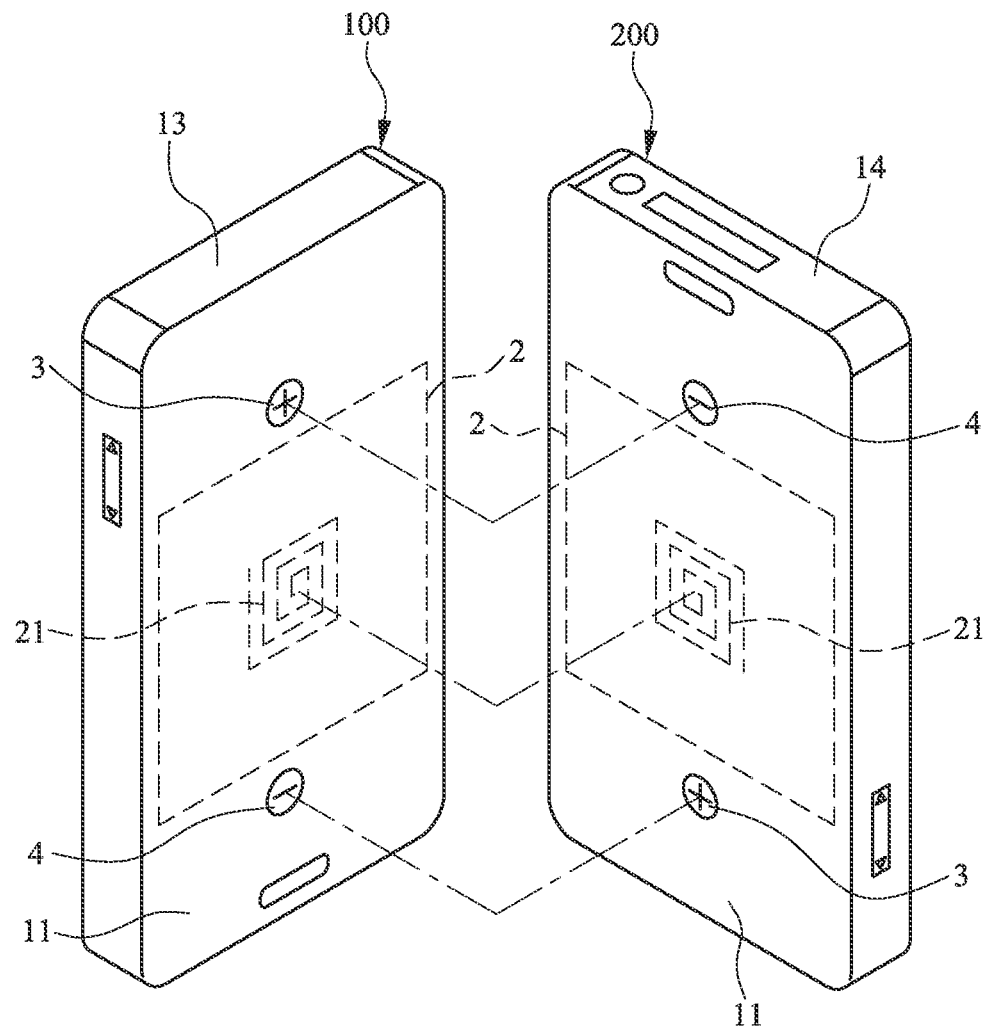
FIG. 2 is a perspective view schematically illustrating two handheld electronic devices according to FIG. 1 before they are positioned with respect to each other.
Figure 3:
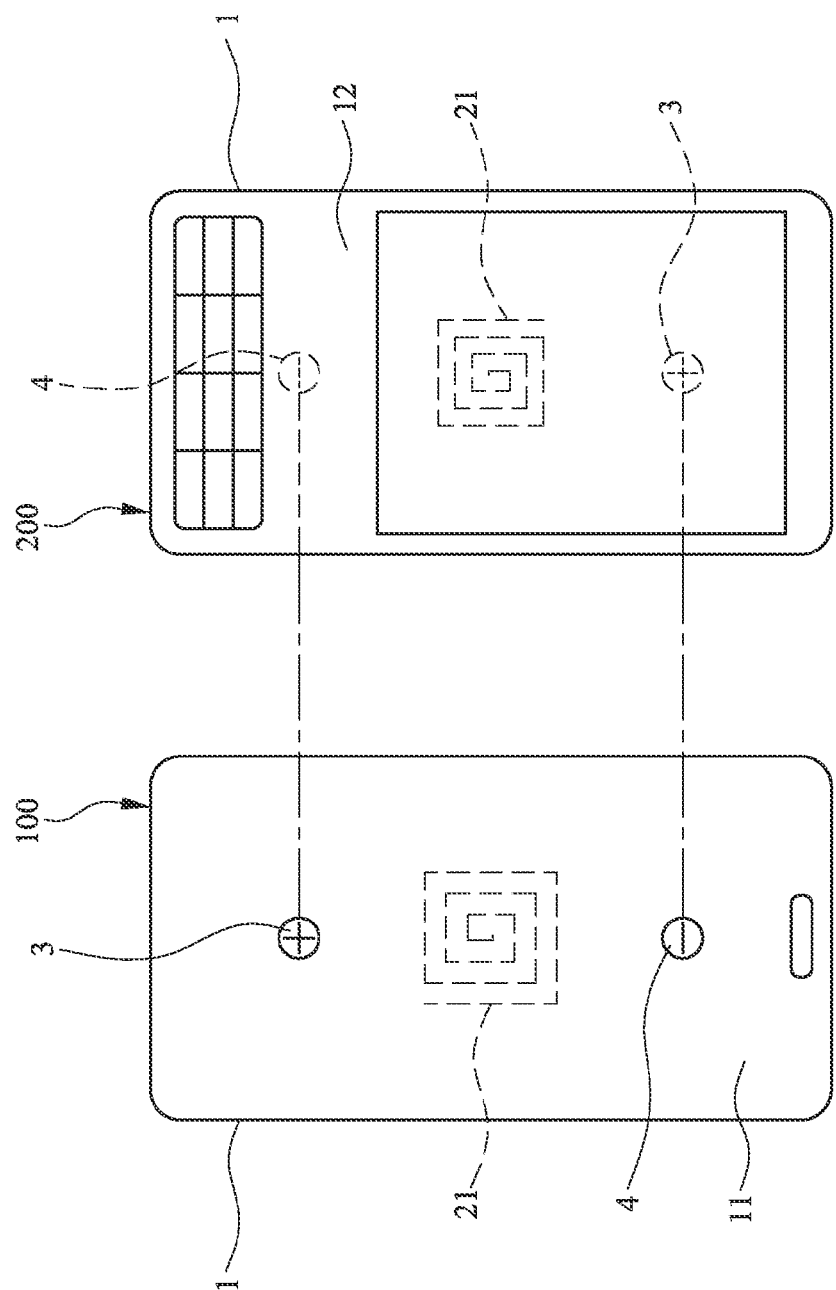
FIG. 3 is a plan view schematically illustrating two handheld electronic devices according to FIG. 1 before they are positioned with respect to each other.
Figure 4:
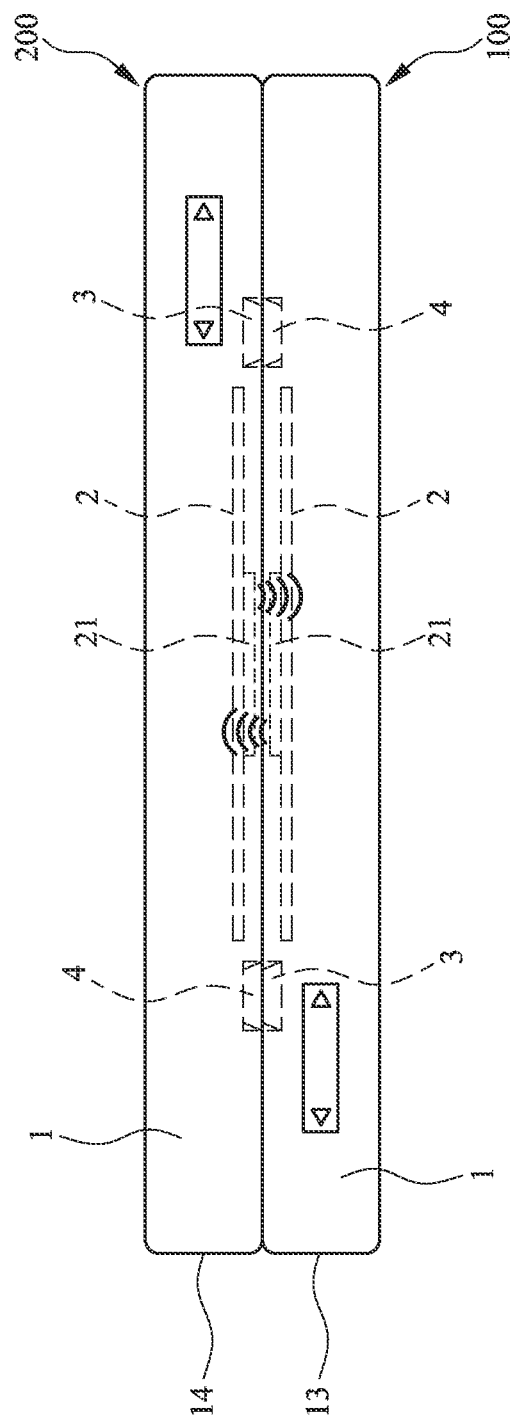
FIG. 4 is a side elevational view schematically illustrating two handheld electronic devices according to FIG. 1 after they are positioned with respect to each other.

With the above components properly assembled, two handheld electronic devices are positionable with respect to each other by means of the positioning element 3 and the counterpart positioning element 4 so that the transceiver circuit modules 21 of the two handheld electronic devices can precisely correspond to each other, thereby minimizing power loss during the process of wireless transmission and wireless reception. In other words, as shown in FIGS. 2, 3, and 4, to proceed with charging and discharging between two handheld electronic devices, the first handheld electronic device 100 is held normally in such a way that a top 13 thereof faces upward and the second handheld electronic device 200 is held up-side down so that a bottom thereof face upward. Under this condition, the positioning element 3 and the counterpart positioning element 4 of the first handheld electronic device 100 exactly and respectively correspond to the counterpart positioning element 4 and the positioning element 3 of and the second handheld electronic device 200, whereby the positioning elements 3 (the positive poles of magnetic attraction bodies) of two devices are respectively attracted by the counterpart positioning elements 4 (the negative poles of magnetic attraction bodies) to effect positioning by which the two transceiver circuit modules 21 can be precisely aligned with each other. FIG. 3 is a schematic planar view showing the second handheld electronic device 200 which is located on the top with the front face 12 facing upward (but up-side down) overlappingly stacked on the first handheld electronic device 100 which is located on the bottom with the back face 11 facing upward.

Second Embodiment

Figure 5:
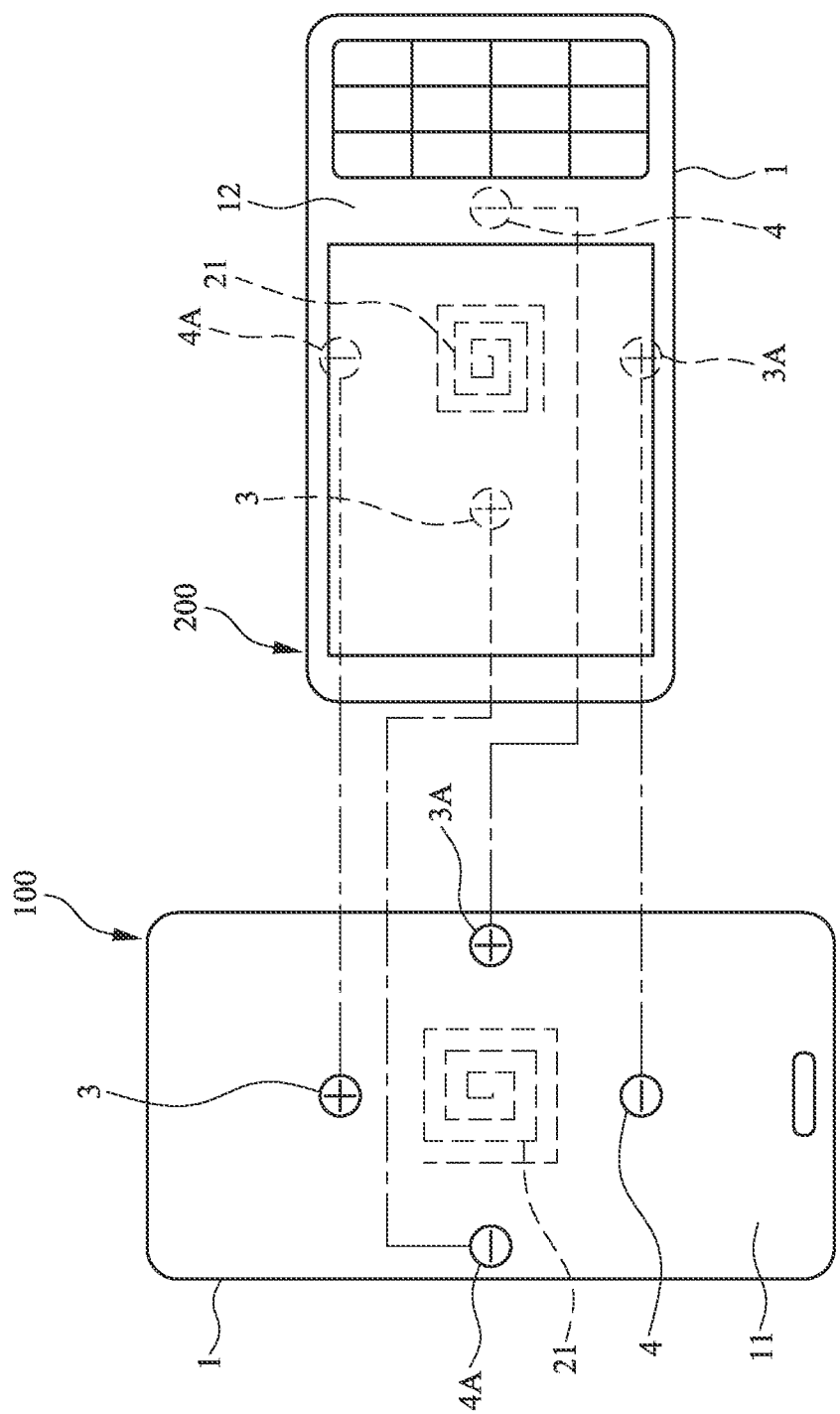
FIG. 5 is a plan view schematically illustrating two handheld electronic devices according to a second embodiment of the present invention before they are positioned with respect to each other.

Referring to FIG. 5, a handheld electronic device with positioning function according to the second embodiment of the present invention is similar to the first embodiment but, as compared to the first embodiment, the second embodiment additionally comprises a second positioning element 3A and a second counterpart positioning element 4A. The second positioning element 3A is identical to the positioning element 3 that has been described above. The second counterpart positioning element 4A is identical to the counterpart positioning element 4 that has been described above.

As shown, the second positioning element 3A and the second counterpart positioning element 4A are mounted to the back face 11 of the device body 1, and a second spacing distance is set between the second positioning element 3A and the transceiver circuit module 21. The location where the second counterpart positioning element 4A is mounted to the back face 11 is corresponding to the location where the second positioning element 3A is mounted so that the transceiver circuit module 21 is located at a center position between the positioning element 3 and the counterpart positioning element 4 and between the second positioning element 3A and the second counterpart positioning element 4A.

As such, to proceed with charging and discharging, the first handheld electronic device 100 that is located on the bottom is held normally and the back face 11 faces upward and the second handheld electronic device 200 that is located at the top and the front face 12 faces upward and is rotated by 90 degrees. Under this condition, the positioning element 3 and the counterpart positioning element 4 and the second positioning element 3A and the second counterpart positioning element 4A of the first handheld electronic device 100 respectively correspond to the second counterpart positioning element 4A and the second positioning element 3A and the counterpart positioning element 4 and the positioning element 3 of the second handheld electronic device 200 so that the positioning element 3 and the second positioning element 3A (the positive poles of magnetic attraction bodies) are respectively attracted to and thus fixed to the counterpart positioning element 4 and the second counterpart positioning element 4A (the negative poles of magnetic attraction bodies) to effect positioning by which the two transceiver circuit modules 21 can be set in precise alignment with each other.

Preferably, the second spacing distance (such as the distance from the second positioning element 3A to the transceiver circuit module 21) is identical to the spacing distance (such as the distance from the positioning element 3 to the transceiver circuit module 21).

Third Embodiment

Figure 6:
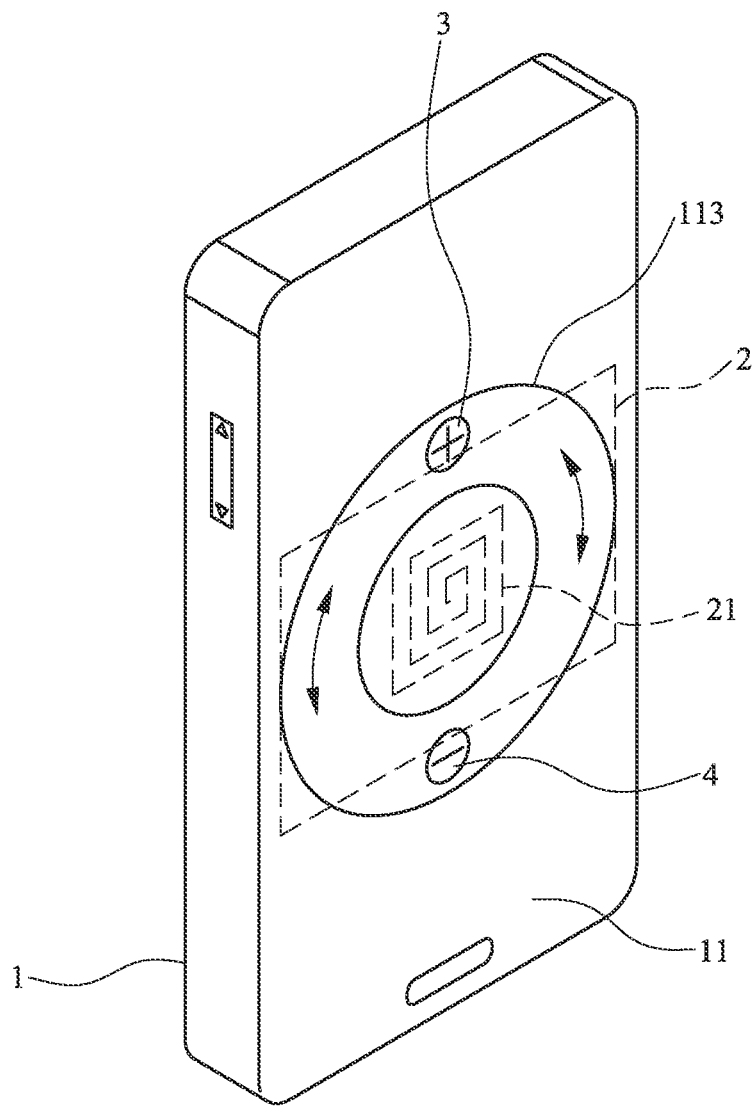
FIG. 6 is a perspective view showing a third embodiment of the present invention.

As shown in FIG. 6, a handheld electronic device with positioning function according to the third embodiment of the present invention is similar to the first embodiment, but, as compared to the first embodiment, the third embodiment additionally comprises a rotation mechanism 113.

As shown, the rotation mechanism 113 is mounted to the back face 11 of the device body 1, so that the rotation mechanism 113 is rotatable around the transceiver circuit module 21 (a circumference of the rotation mechanism being movably fit to an inner circumference of an opening defined in the back face 11). The positioning element 3 and the counterpart positioning element 4 are mounted to the rotation mechanism 113. Particularly, to achieve magnetic attraction and fixing, the embodiments described above require rotation of the handheld electronic device itself, while the third embodiment needs only to rotate the rotation mechanism 113.

Apparently, the rotation mechanism 113 is also applicable to the second embodiment (not shown) by simply mounting the second positioning element 3A and the second counterpart positioning element 4A to the rotation mechanism 113.

Figure 6A:
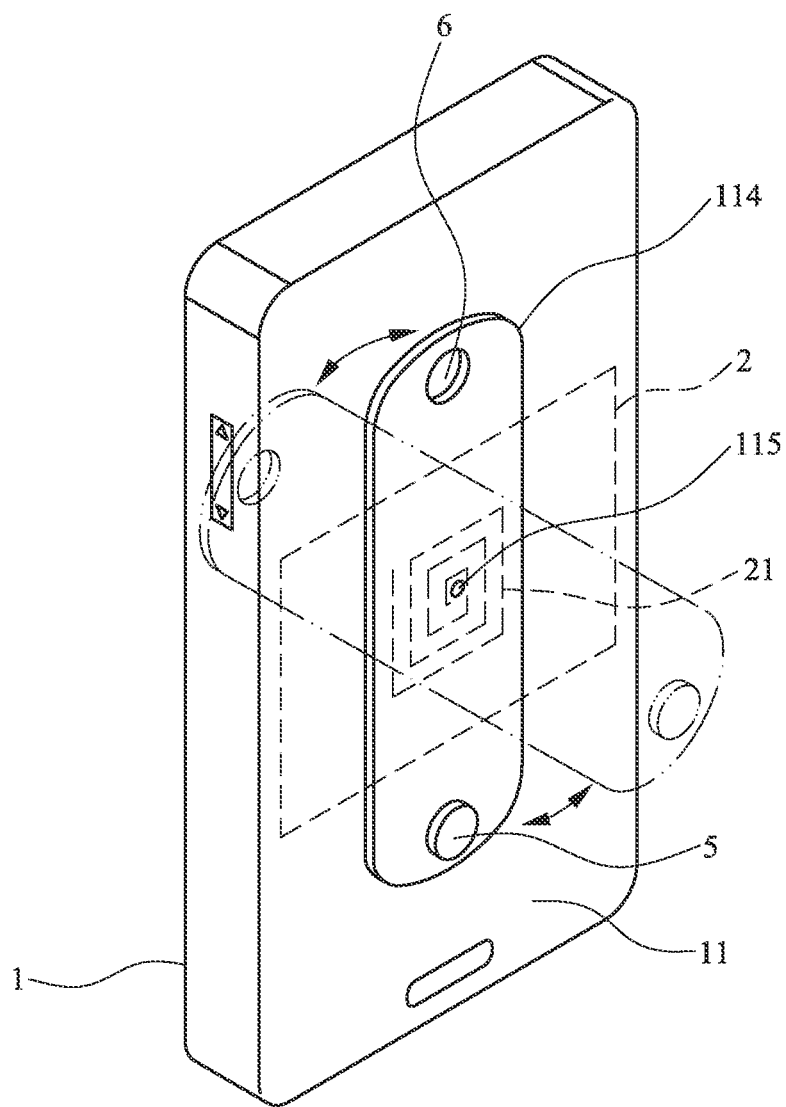
FIG. 6A is a perspective view showing an alternative form of the third embodiment of the present invention.

Also referring to FIG. 6A, which is a perspective view showing an alternative form of the third embodiment of the present invention, the rotation mechanism 114 comprises an elongate plate that is pivotally mounted to the back face 11 of the device body 1 by an axle 115. The elongate plate has two ends that are rotatable around the transceiver circuit module 21 and the two ends of the elongate plate are respectively provided with a positioning element 5 and a counterpart positioning element 6, wherein the positioning element 5 is a projection member (such as a peg or a snap-on block) and the counterpart positioning element 6 is a recessed member (such as a cavity or a snap-on hole) corresponding to the projection member, so that the positioning element 5 can be fit into the counterpart positioning element 6 to effect positioning.

Fourth Embodiment

Figure 7:
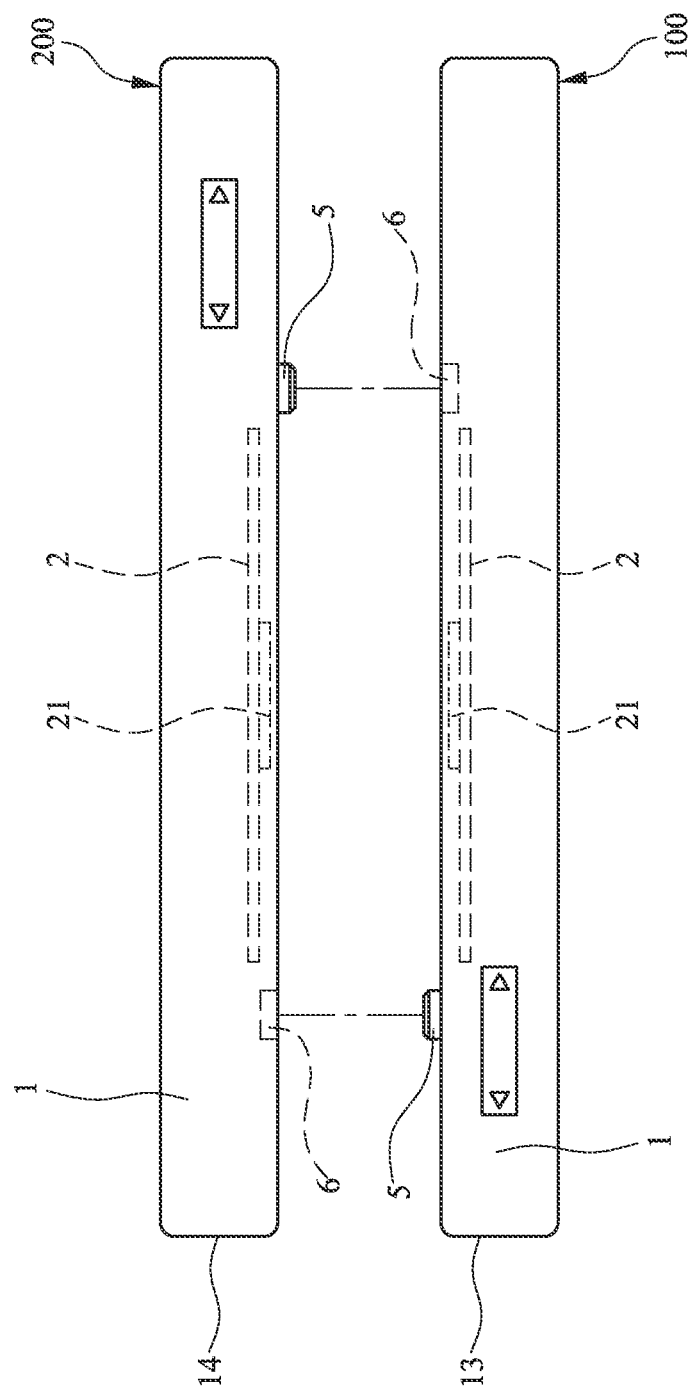
FIG. 7 is a side elevational view schematically illustrating two handheld electronic devices according to a fourth embodiment of the present invention before they are positioned with respect to each other.

As shown in FIG. 7, a handheld electronic device with positioning function according to the fourth embodiment of the present invention is similar to the first embodiment except that the positioning element 5 and the counterpart positioning element 6 are different from the positioning element 3 and the counterpart positioning element 4 of the first embodiment.

As shown, the positioning element 5 is a projection member (such as a peg or a snap-on block) and the counterpart positioning element 6 is a recessed member (such as a cavity or a snap-on hole) corresponding to the projection member, so that the positioning element 5 can be fit into the counterpart positioning element 6 to effect positioning.

Apparently, the projecting positioning element 5 and the recessed counterpart positioning element 6 are applicable to the first embodiment illustrated in FIGS. 1-4, the second embodiment shown in FIG. 5, and the third embodiment shown in FIG. 6 by replacing the magnetic attraction bodies with projecting and recessed members.

Figure 7A:
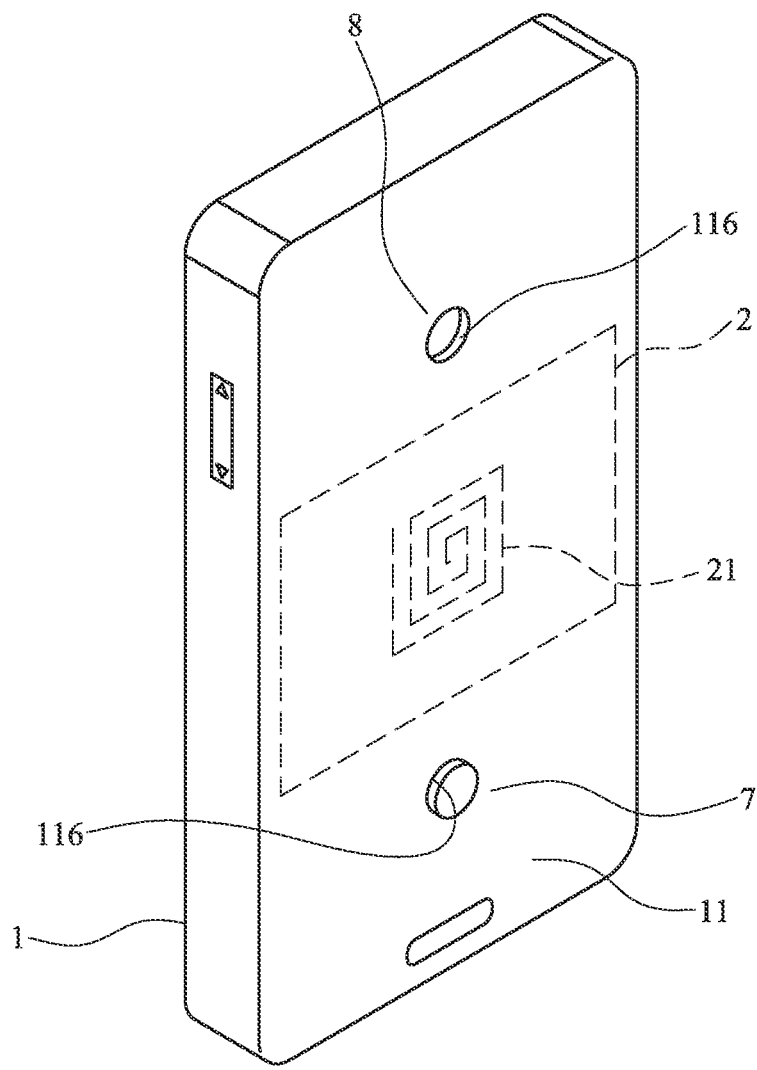
FIG. 7A is a perspective view showing an alternative form of the fourth embodiment of the present invention.

Referring to FIG. 7A, which is a perspective view showing an alternative form of the fourth embodiment of the present invention, the positioning element 7 and the counterpart positioning element 8 are respectively set in two recessed sections 116 (a recessed hole as shown in the drawing) formed in the back face 11 of the device body 1, and the positioning element 7 and the counterpart positioning element 8 are both depressible button mechanisms (similar to pushbutton switch that is vertically depressible and is resiliently extendible and retractable). As shown, the positioning element 7 is a depressible button mechanism before being depressed so as to show a projecting configuration, while the counterpart positioning element 8 is a depressible button mechanism after being depressed so as to show a recessed configuration. The positioning element 7 that shows a projecting configuration before being depressed is insertable into the counterpart positioning element 8 that shows a recessed configuration after being depressed to effect positioning.

Figure 8A:
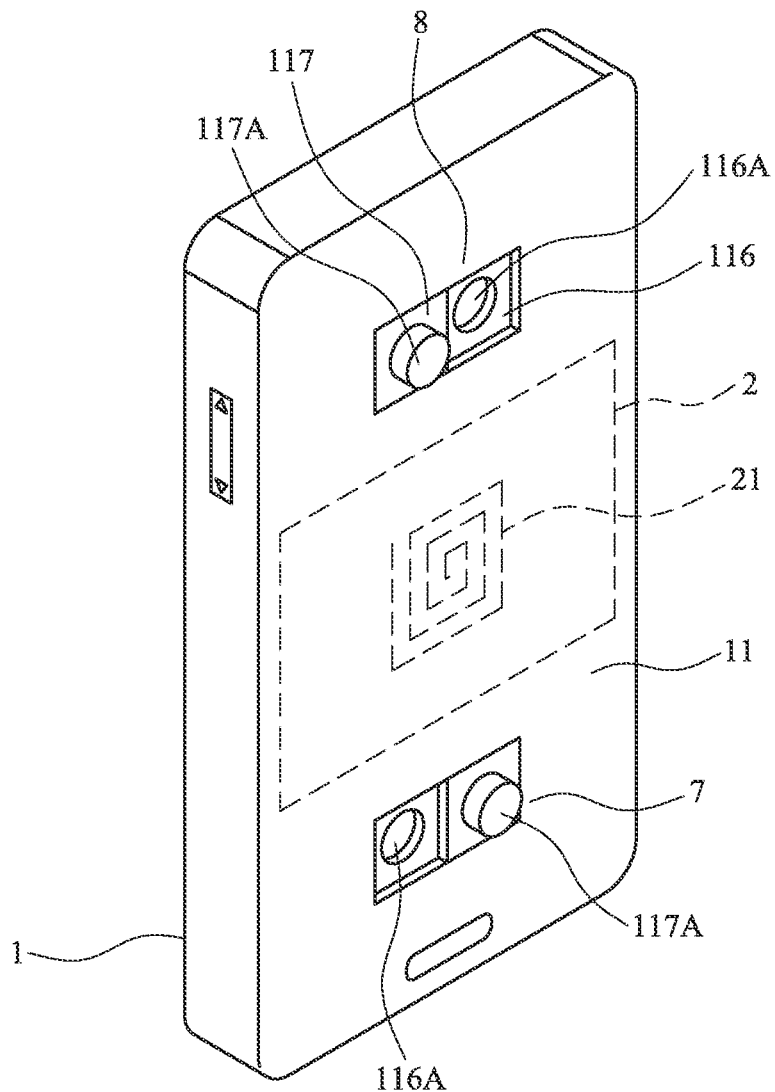
FIG. 8A is a perspective view showing a first illustrative alternative form of FIG. 7A according to the present invention.

Referring to FIG. 8A, which is a perspective view showing a first illustrative alternative form of the embodiment illustrated in FIG. 7A, the positioning element 7 and the counterpart positioning element 8 are each made a slidable member, and the slidable member comprises a recessed section 116 formed in the back face 11 of the device body 1. A cavity 116A is formed in one end of the recessed section 116 and a slide block 117 is received in an opposite end of the recessed section 116. The slide block 117 forms a projection 117A that corresponds to cavity 116A for positionability with respect to each other. In other words, the positioning element 7 is a slidable member of which the slide block 117 is moved to the left, while the counterpart positioning element 8 is a slidable member of which the slide block 117 is moved to the right, whereby the cavity 116A and the projection 117A of the positioning element 7 are respectively positionable with respect to the projection 117A and the cavity 116A of the counterpart positioning element 8.

Figure 8B:
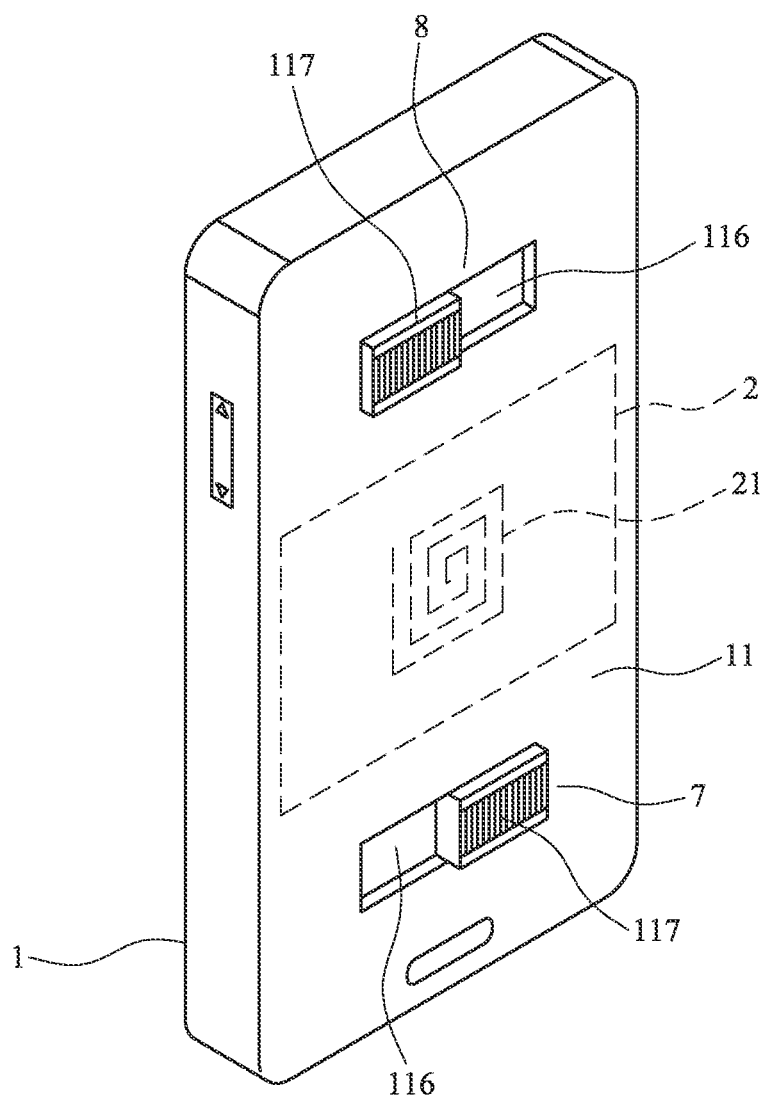
FIG. 8B is a perspective view showing a second illustrative alternative form of FIG. 7A according to the present invention.

Referring to FIG. 8B, which is a perspective view showing a second illustrative alternative form of the embodiment illustrated in FIG. 7A, the positioning element 7 and the counterpart positioning element 8 are each a slidable member, and the slidable member comprises a recessed section 116 formed in the back face 11 of the device body 1. A slide block 117 that is movable leftward and rightward is received in one end of the recessed section 116. In other words, the slide block 117 that is located at one end of the positioning element 7 is insertable into an opposite end of the recessed section 116 of the counterpart positioning element 8.

Figure 8C:
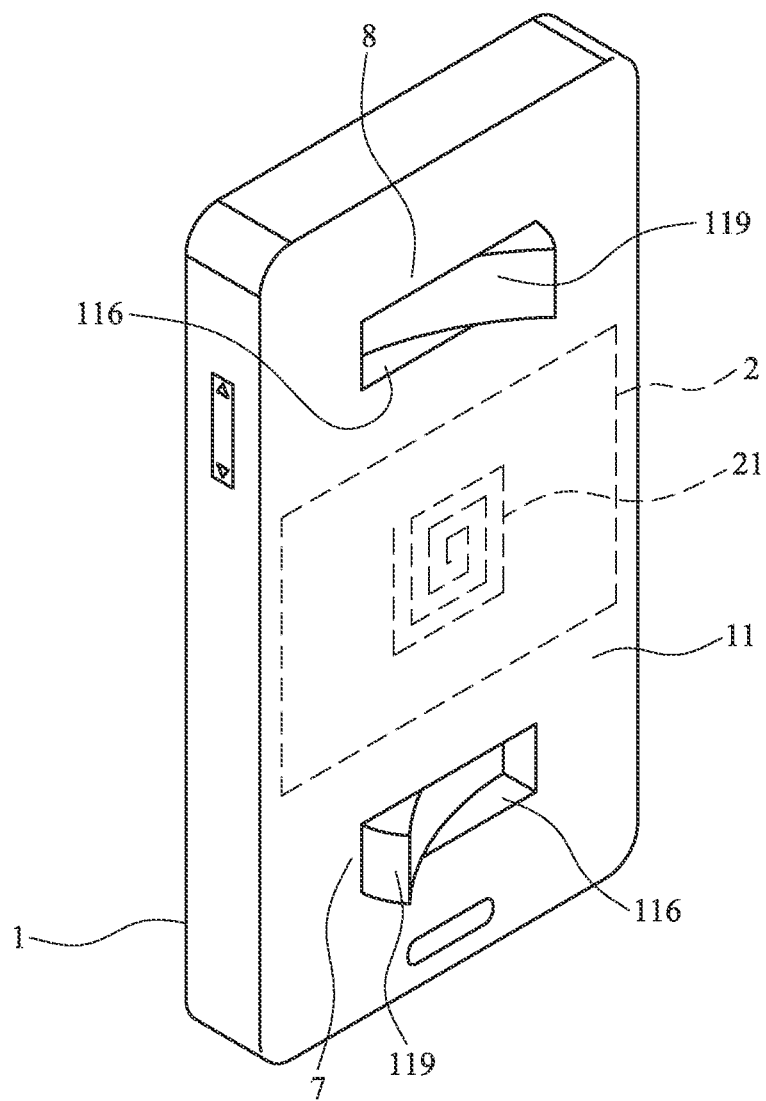
FIG. 8C is a perspective view showing a third illustrative alternative form of FIG. 7A according to the present invention.

Referring to FIG. 8C, which is a perspective view showing a third illustrative alternative form of the embodiment illustrated in FIG. 7A, the positioning element 7 and the counterpart positioning element 8 are each a seesaw mechanism (similar to a seesaw switch). The seesaw mechanism comprises a recessed section 116 formed in the back face 11 of the device body 1 and a seesaw body 119 is received in and pivotally mounted to the recessed section 116 and is capable of seesaw operation in the recessed section 116 to selectively raise or lower either end thereof. In other words, the seesaw body 119 of the positioning element 7 of which one end is raised is insertable into the lowered end of the seesaw body 119 of the counterpart positioning element 8 to effect positioning.

Fifth Embodiment

Figure 9:
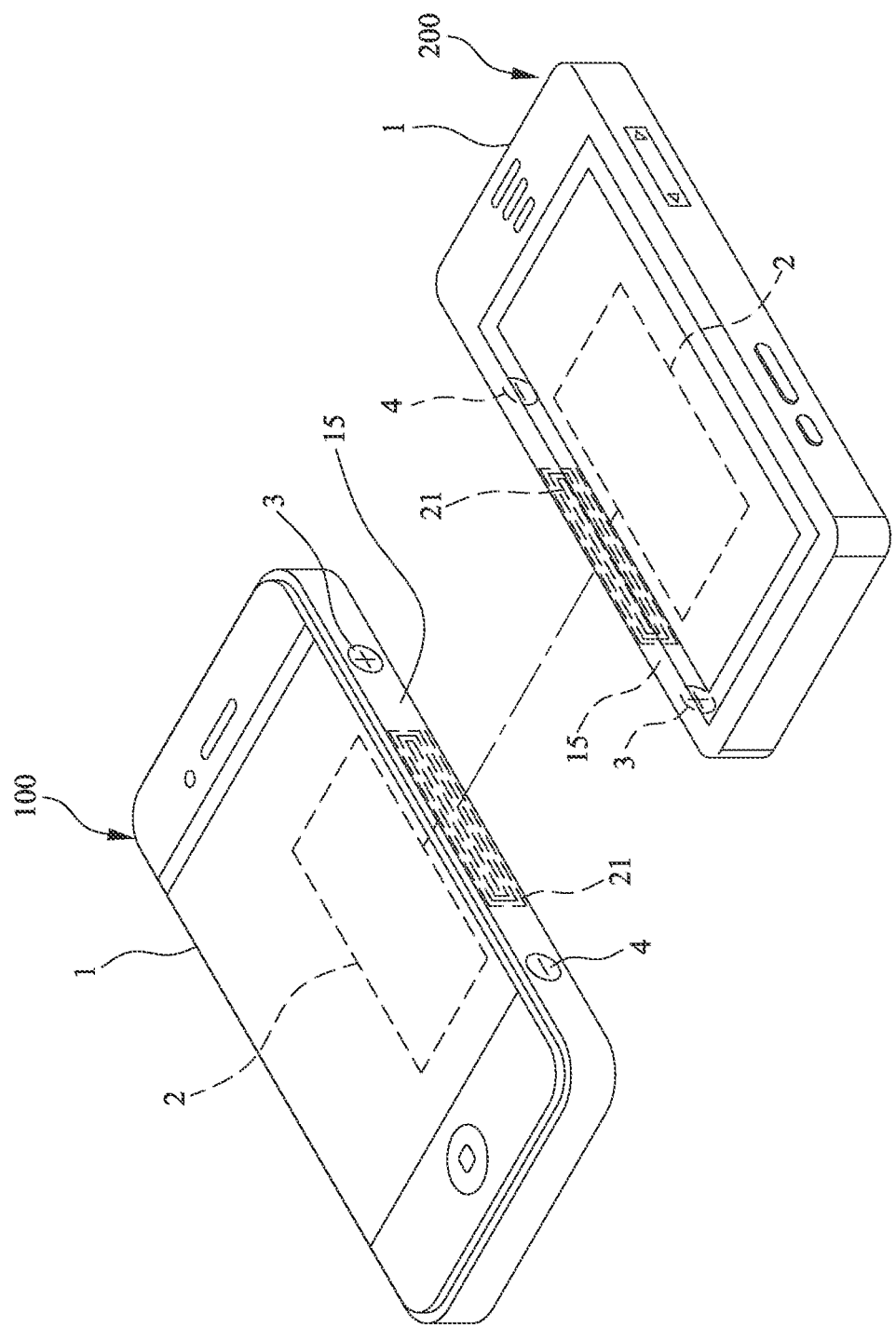
FIG. 9 is a perspective view schematically showing two handheld electronic devices according to a fifth embodiment of the present invention that are positionable with respect to each other through lateral sides thereof.

As shown in FIG. 9, a handheld electronic device with positioning function according to the fifth embodiment of the present invention is similar to the first embodiment but is different from the first embodiment by arranging the positioning element 3, the counterpart positioning element 4, and the transceiver circuit module 21 at a lateral side 15 of the device body 1. Thus, the first handheld electronic device 100 and the second handheld electronic device 200 are positionable with respect to each other via the lateral sides 15 thereof, whereby the two positioning elements 3 (the positive poles of magnetic attraction bodies) can be respectively attracted to and fixed to the two counterpart positioning elements 4 (the negative poles of magnetic attraction bodies) to effect positioning by which the two transceiver circuit modules 21 are set in precise alignment with each other. Apparently, the positioning elements 5, 7, the counterpart positioning elements 6, 8, and the transceiver circuit modules 21 shown in FIGS. 7 and 7A are also applicable to being mounted to the lateral side 15 of the device body 1.

Further, the handheld electronic device according to the present invention can be for example a mobile phone, but is not limited to mobile phone and can alternatively be a satellite navigator, an electronic dictionary, or a multimedia player.

In summary, the present invention provides a handheld electronic device with positioning function of which the features are that in the process of charging or discharging a handheld electronic device, for positioning with respect to another handheld electronic device, through rotation or putting up-side down of one of the handheld electronic devices, mutual positioning can be realized between the positioning elements and the counterpart positioning elements of the devices thereby making the transceiver circuit modules of the two handheld electronic devices precisely aligning with each other, so that power loss incurring in the process of wireless transmission and wireless reception can be minimized and the drawbacks of the conventional devices can be overcome to satisfy the needs for bidirectional wireless charging and discharging.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A handheld electronic device with positioning function, comprising:
   a device body;
   a bidirectional wireless charging/discharging unit, which is arranged inside the device body and comprises a transceiver circuit module for wireless transmission and wireless reception;
   at least one positioning element, which is mounted to one side of the device body in such a way that the positioning element and the transceiver circuit module are spaced from each other by a spacing distance; and
   at least one counterpart positioning element, which is mounted to the side of the device body, the counterpart positioning element and the positioning element being positionable with respect to each other, the counterpart positioning element being set at a location of the side that corresponds to a location where the positioning element is set;
   whereby two handheld electronic devices apply the positioning elements and the counterpart positioning elements to position with respect to each other so as to have the transceiver circuit modules of the two handheld electronic devices precisely aligned with respect to each other.

2. The handheld electronic device with positioning function as claimed in claim 1, wherein the positioning element is a magnetic attraction body having a positive pole facing outward and the counterpart positioning element is a magnetic attraction body having a negative pole facing outward, whereby the positioning element and the counterpart positioning element are magnetically attractable to each other.

3. The handheld electronic device with positioning function as claimed in claim 1, wherein the positioning element is a projection member and the counterpart positioning element is a recessed member corresponding to the projection member, whereby the positioning element is insertable into the counterpart positioning element to effect positioning.

4. The handheld electronic device with positioning function as claimed in claim 1, wherein the device body comprises a rotation mechanism mounted to the side, the rotation mechanism being rotatable around the transceiver circuit module, the positioning element and the counterpart positioning element being mounted to the rotation mechanism.

5. The handheld electronic device with positioning function as claimed in claim 1, wherein the device body comprises a rotation mechanism mounted to the side, the rotation mechanism having two ends that are rotatable about the transceiver circuit module, the positioning element and the counterpart positioning element being respectively mounted to the two ends of the rotation mechanism.

6. The handheld electronic device with positioning function as claimed in claim 1, wherein the positioning element and the counterpart positioning element are each a depressible button mechanism that is vertically depressible for resilient extension and retraction, the two depressible button mechanisms being respectively set in two recessed sections formed in the side of the device body, the positioning element being a depressible button mechanism before being depressed so as to show a projecting configuration, the counterpart positioning element being a depressible button mechanism after being depressed so as to show a recessed configuration, whereby the positioning element that shows a projecting configuration before being depressed is insertable into the counterpart positioning element that shows a recessed configuration after being depressed to effect positioning.

7. The handheld electronic device with positioning function as claimed in claim 1, wherein the side of the device body is a back face of the device body.

8. The handheld electronic device with positioning function as claimed in claim 1, wherein the side of the device body is a lateral side of the device body.

9. A handheld electronic device with positioning function, comprising:
   a device body;
   a bidirectional wireless charging/discharging unit, which is arranged inside the device body and comprises a transceiver circuit module for wireless transmission and wireless reception;
   a first positioning element, which is mounted to one side of the device body in such a way that the first positioning element and the transceiver circuit module are spaced from each other by a first spacing distance;
   a first counterpart positioning element, which is mounted to the side of the device body, the first counterpart positioning element and the first positioning element being positionable with respect to each other, the first counterpart positioning element being set at a location of the side that corresponds to a location where the first positioning element is set;
   a second positioning element, which is identical to the first positioning element and mounted to the side of the device body in such a way that the second positioning element and the transceiver circuit module are spaced from each other by a second spacing distance; and a second counterpart positioning element, which is identical to the first counterpart positioning element and mounted to the side of the device body, the second counterpart positioning element being set at a location of the side that corresponds to a location where the second positioning element is set;

whereby two handheld electronic devices apply the first positioning element, the second positioning element, the first counterpart positioning element and the second counterpart positioning element to position with respect to each other so as to have the transceiver circuit modules of the two handheld electronic devices precisely aligned with respect to each other.

10. The handheld electronic device with positioning function as claimed in claim 9, wherein the second spacing distance is equal to the first spacing distance.

11. The handheld electronic device with positioning function as claimed in claim 9, wherein the first positioning element and the second positioning element are magnetic attraction bodies having a positive pole facing outward and the first counterpart positioning element and the second counterpart positioning element are magnetic attraction bodies having a negative pole facing outward, whereby the first positioning element, the second positioning element, the first counterpart positioning element and the second counterpart positioning element are magnetically attractable to each other.

12. The handheld electronic device with positioning function as claimed in claim 9, wherein the first positioning element and the second positioning element are projection members and the first counterpart positioning element and the second counterpart positioning element are recessed members corresponding to the projection member, whereby the first positioning element and the second positioning element are insertable into the first counterpart positioning element and the second counterpart positioning element to effect positioning.

13. The handheld electronic device with positioning function as claimed in claim 9, wherein the device body comprises a rotation mechanism mounted to the side, the rotation mechanism being rotatable around the transceiver circuit module, the first positioning element, the second positioning element, the first counterpart positioning element and the second counterpart positioning element being mounted to the rotation mechanism.

14. The handheld electronic device with positioning function as claimed in claim 9, wherein the device body comprises a rotation mechanism mounted to the side, the rotation mechanism having two ends that are rotatable about the transceiver circuit module, the first positioning element, the second positioning element, the first counterpart positioning element and the second counterpart positioning element being respectively mounted to the two ends of the rotation mechanism.

15. The handheld electronic device with positioning function as claimed in claim 9, wherein the first positioning element, the second positioning element, the first counterpart positioning element and the second counterpart positioning element are each a depressible button mechanism that is vertically depressible for resilient extension and retraction, the two depressible button mechanisms being respectively set in two recessed sections formed in the side of the device body, the first positioning element and the second positioning element being depressible button mechanisms before being depressed so as to show a projecting configuration, the first counterpart positioning element and the second counterpart positioning element being depressible button mechanisms after being depressed so as to show a recessed configuration, whereby the first positioning element and the second positioning element that show projecting configurations before being depressed are insertable into the first counterpart positioning element and the second counterpart positioning element that show recessed configurations after being depressed to effect positioning.

16. The handheld electronic device with positioning function as claimed in claim 9, wherein the side of the device body is a back face of the device body.

17. The handheld electronic device with positioning function as claimed in claim 9, wherein the side of the device body is a lateral side of the device body.

* * * * *